United States Patent
Hystad

[11] Patent Number: 6,000,278
[45] Date of Patent: Dec. 14, 1999

[54] DEVICE FOR DETECTING LEAKAGE IN FLANGE JOINTS

[76] Inventor: Anne Elise Hystad, Kopervik, Norway

[21] Appl. No.: 09/066,311
[22] PCT Filed: Oct. 24, 1996
[86] PCT No.: PCT/NO96/00251
  § 371 Date: Apr. 27, 1998
  § 102(e) Date: Apr. 27, 1998
[87] PCT Pub. No.: WO97/15814
  PCT Pub. Date: May 1, 1997

[30] Foreign Application Priority Data

Oct. 26, 1995 [NO] Norway ................................. 954271

[51] Int. Cl.[6] ............................. G01M 3/20; G21C 17/00
[52] U.S. Cl. ................................................. 73/46; 73/49.3
[58] Field of Search ................................. 73/40, 40.5 R, 73/46, 49.1, 49.3

[56] References Cited

U.S. PATENT DOCUMENTS

| | | |
|---|---|---|
| 1,497,652 | 6/1924 | Browne . |
| 3,141,685 | 7/1964 | Watts . |
| 3,290,047 | 12/1966 | Mayer . |
| 4,019,371 | 4/1977 | Chaplin et al. . |
| 4,410,186 | 10/1983 | Pierce, Jr. . |
| 4,723,441 | 2/1988 | Sweeney ................................. 73/40.5 R |
| 5,170,659 | 12/1992 | Kemp . |
| 5,182,076 | 1/1993 | Seroux et al. ........................... 376/250 |
| 5,383,351 | 1/1995 | Kotlyar ....................................... 73/40 |
| 5,419,360 | 5/1995 | Lechevalier ............................. 137/312 |
| 5,880,358 | 3/1999 | Emmitte, Jr. ............................. 73/49.8 |

FOREIGN PATENT DOCUMENTS 175832  5/1994  Norway .

Primary Examiner—Max Noori
Attorney, Agent, or Firm—Nexsen Pruet Jacobs & Pollard, LLP

[57] ABSTRACT

A device serves to enable detection of leakages in flange joints in pipelines. Between end faces (22, 24) adjacent, opposing flange pipe ends, a packer (30') has been disposed, the packer being adapted to bear sealingly against seat faces which said end faces (22, 24) exhibit. At each of the opposite side faces of the packer (30'), an annular groove (26', 28') has been formed, said annular grooves being closed and thereafter forming annular cavities when the joint has been established. Between at least one cavity (28') and the surroundings outside the pipeline (14, 16), a fluid connection (38') is established. The packer (30') is formed with a through-going hole (32') establishing fluid-communication between the two annular cavities (26', 28').

5 Claims, 5 Drawing Sheets

DEVICE FOR DETECTING LEAKAGE IN FLANGE JOINTS

The present invention relates to a device for testing flange connections with regard to leakages within a pipe system, e.g. a pipe installation wherein the joints between adjacent individual pipes comprise joint flanges, and wherein a packer is sealingly disposed between opposing end faces of neighbouring pipes at the joint flanges, and wherein, at either side of said packer, an annular groove is formed, the circumference thereof being situated in a lateral plan in respect of the longitudinal axis of the pipes, and wherein the packer, within an area defined by the two parallel annular grooves, is provided with a through-going hole, bringing the annular cavities defined by the two annular grooves and the packer into fluid communication with each other.

Advantageously, the device according to the invention should be applicable in all kinds of flange connections requiring testing in respect of tightness.

Particularly in connection with process installations, even minor leakages in the flange joints of the pipelines represent significant explosion risks. Therefore, testing of flange joints is very important, and such testing is usually carried out at frequent intervals.

When testing pipe installations conventionally within the process industry, it may well take up to a day in order to establish the necessary test pressure, i.e. a pressure of a sufficient magnitude to control whether the flange joints are tight or not. Sufficient test pressure has a value substantially above ordinary process pressure and may be e.g. 500 bars. The process installation is coupled to a pressure gauge. If the pressure gauge shows a pressure drop after test pressure has been built up within the pipe installation, at least one leakage is detected within the installation.

Upon a leakage detection within a process installation, all flange joints, in accordance with conventional technique, must be covered with tape or foam surrounding the flange joints, in order to try to conclude visually where the leakage (s) is/are situated. Subsequently to repairing and sealing the leaking flange joint(s), test pressure once more must be established, prior to relieving the pressure again, and restarting the process installation.

Such as the testing takes place today, namely through a test pressure built up internally in the pipeline, one does not know which one of the two seat faces in the flange joint that is sealing. After demounting the two adjacent joint flanges subsequently to detecting a leakage, the packer is usually discarded because it is not easy to determine whether it is damaged or not. However, such packers, normally consisting of steel, are very expensive to provide, and it is merely due to lack of technology that good packers in many cases unnecessarily are replaced by new ones.

Thus, conventional technique is aimed at pressure testing the entire process installation in respect of exposing leakage, nitrogen often being used as test medium. At the oil field Statfjord A in the North Sea, such a test operation after the plant has been shut down will cost several millions (Norwegian) kroner (crowns) for equipment and nitrogen. If a leakage is detected, the plant must be shut down, repaired and, thereafter, pressure tested once more.

U.S. Pat. No. 2,491,599 deals with a casing anchorage in the form of a flange shaped with a channel through which a test medium can be injected into a cavity defined by sealing rings. The sole feature of this known device that also is appearing in the present invention, is the channel through the flange. In other respects, both the flange connection and the packers used belong to an entirely different kind than the ones used in association with the present invention.

In the device according to U.S. Pat. No. 3,290,047, packers as well as flanges may be formed with channels, namely in order to drain the flange connections. The packers used are quite unfit for use in process installations where the process pressure should have caused the packers to collapse.

GB patent specification No. 1,558,857 and GB published patent application No. 2,177,166 deal with devices having substantially mutual common features. In order to enable pressurization of the sealing ring in these known devices, an extra auxiliary packer is mounted outside the primary sealing ring, and a test fluid is passed in therebetween. This pressurizes the sealing ring from the outside. Leakage in the outer auxiliary packer makes pressure testing impossible. In practice, a small leakage in the auxiliary packer results in the replacement of both this one and the sealing ring by new ones, whereafter the test has to be carried out once more.

U.S. Pat. No. 3,141,685 deals with a special packer insert for pipe joints. The sealing ability of the packer insert from the outside and into the pipe is significantly poorer than in the opposite direction. The packer cannot be loaded with working pressure from the outside without simultaneously pressurizing the entire pipe system. Such packers as this U.S. patent specification deals with, may probably not be subjected to pressure testing of the order herein described, without the risk of damage followed by a leakage in a packer which originally was faultless.

No patent specification No. 175 832 deals with a substantially improved device in respect of the remainder of prior art technique on the area in question. This patent specification deals with a device for leakage testing at flange connections serving to connect individual pipes of a pipe installation, wherein a sealing ring is placed between adjacent joint flanges. The sealing ring which has a very small cross-sectional area in relation to the diameter, is thereby placed such that it, at opposite sides thereof, engages partly into two coaxial, equally large and mirror inverted, annular grooves, formed one in each of the opposing end faces.

In the area of the opposing, coaxial grooves in the neighbouring end face portions of the pipe ends, the sealing ring is formed with a through-going hole which, thus, puts the annular cavities defined by said annular grooves and the opposite end faces of the sealing ring, into fluid communication with each other. A channel can with one of its ends be connected to one of said annular cavities (which, in its turn, is connected to the other), the other end of the channel being passed to an external position where it can be put into connection with an external pressure source in order to enable pressurization of the annular cavities. According to the construction, this channel may be formed in the sealing ring or in one of the joint flanges.

Thus, by means of this known device for pressurization of potential leakage places in flange joints of pipe installations it is possible to pressurize the annular cavities without having to pressurize the entire pipe installation. The pressure source may be a presure bottle containing a pressure medium and said channel is assigned a presure gauge, test pressure being read on the latter.

Possible leakage along the opposite sealing faces of the sealing ring and the opposing seat face portions of end faces of adjacent pipe ends resting thereagainst results immediately in a pressure drop to be read on the pressure gauge. If the test pressure, on the contrary, is maintained constant according to the pressure gauge, the flange connection is considered as being tight, and all four sealing seats (the annular grooves are trapeziodal and, thus, form two seat faces in each groove) and thereagainst resting sealing ring faces have been tested.

Apart from the fluid connection through the sealing ring's through-going hole, the two said annular cavities should be closed, provided that the flange joint place is tight, the partial engagement of the sealing ring into the two opposing, mirror symmetrically positioned annular grooves being intended to secure the tightness.

In spite of the fact that a test device according to No. patent specification No. 175 832 functions satisfactorily in connection with testing of flange joints in pipe installations in respect of tightness, this known device, nevertheless, suffers from disadvantages and deficiencies.

The sealing ring is shaped specially in order to with opposite sides being able to engage sealingly into the opposing, mirror symmetrically disposed grooves in adjacent end faces of neighbouring flange pipe ends to be joint.

These annular grooves have each a trapezoidal cross-section, and the non-parallel sides of the trapezoid constitute seat faces whereagainst the opposing sealing faces of the sealing ring shall bear sealingly. Thus, there are totally four seat faces at the flange joint (within the annular grooves) and four sealing faces on the sealing ring. In a preferred embodiment, the sealing ring has an octagonal cross-section.

Such sealing rings have a very small cross-sectional area in relation to the diameter. They have to be precision-manufacured in order to secure that all four sealing faces bear sealingly against the flange joint's four complementary seat faces which, likewise, have to be made using high accuracy. The smallest distortion in the sealing ring will inevitably lead to leakages at at least one seat face.

Another disadvantage is that this known device lacks a means warning a leakage.

A further disadvanteg consists in that the opposing, mirror symmetrically located grooves are formed in opposing end faces of adjacent flange pipe ends, which necessitates a very accurate adaption between annular groove and sealing ring each and every time the latter has to be replaced by a new one.

Therefore, in accordance with the present invention one has aimed at providing a device of the kind defined introductorily wherein deficiencies, disadvantages and restrictions of application and use of prior art have been either eliminated or reduced to a substantial degree.

According to the invention one has intended to increase the area with which the packer's opposite sealing faces bear against the seat faces of the flange pipe ends, and wherein the packer is formed such that it, preferably, can be formed with said annular, inverted grooves which, then, are being closed by the opposing end faces of the two adjacent flange pipe ends, forming said annular cavities communicating with each other through the packer's through-going hole, known per se. Besides, it is intended to provide a safer anchorage of the packer than previously achievable.

In a device of the kind defined introductorily, said objects are realized through shaping, designing and adapting the device as set forth in the characterizing part of the following claim 1.

As packer is, in accordance with the invention, used a flat disc-shaped packer having a substantial surface area.

This flat and disc-shaped packer which may have the same diameter as the joint flanges, has a central hole corresponding with the bore though the pipeline. Moreover, this flat, disc-shaped packer may have bolt holes corresponding to the bolt holes of the pipe flanges and which are brought to register therewith when the bolt connections are to be established.

Such a flat and disc-shaped packer which has been manufactured in steel or another suitable material, may be formed with such a large thickness that said annular grooves may be formed in the opposite end faces of the packer. Such a shape or design which does not constitutes a compulsory feature of the present invention, involves adaption advantages for the packer in relation to possible annular grooves in opposing flange pipe ends. The packer's annular grooves which, at opposite sides thereof, are closed by adjacent end faces of the flange pipe ends, forming mutually fluid-connected but outwardly closed, annular cavities, may have rounded, e.g. circle arc-shaped cross-sectional form.

In accordance with a particularly preferred embodiment, the externally positioned, outer end of a channel or a pipe extending through a flange pipe end portion is provided with a state indicator, the internally positioned, inner end of the channel or pipe opening into one of the annular cavities as known per se, the state indicator being adapted to allocate leakage upon visual consideration: Upon a leakage at a flange joint place, leakage-fluid will eventually land in the cavity closest to the leakage place, said cavity being in fluid communication with the other cavity. From the first-mentioned cavity, the leakage-fluid will advance up through the channel in the flange pipe end portion, possibly after having passed through the packer's through-going hole and into the other cavity (depending on to which cavity said channel is connected), said channel's external end carrying said state indicator. Upon pressurization and leakage testing, the channel may, alternatively, be connected to a pressure source and assigned a pressure gauge, in accordance with prior art technique. From the channel end, said leakage-fluid enters a closed chamber where one wall of the chamber is formed by a displaceable piston's bottom face. The fluid urges the piston towards the free end of the state indicator, where a longitudinal portion of the piston finally will project somewhat outside the adjacent end of the indicator, while the remaining part of the piston is kept within the cylinder of the state indicator by means of a stop means. An outwardly projecting piston portion indicates leakage at the flange joint place.

Further objects, advantages and features of the device according to the invention will be explained more in detail in the following description with reference to the attached drawings, wherein:

FIG. 1 shows an axial section through a flange joint place, where a flat disc-shaped packer according to the invention has been placed sealingly in between two opposing end faces of the flange pipe ends, of which one is formed with a channel extending to the outside of the flange joint, where the outer end of the channel with a coupling socket is connected to a threaded coupling piece on the end of a pipe which, as known per se, is assigned a pressure source, e.g. in the form of a pressure bottle containing nitrogen, and a presure gauge, and where mirror-inverted, annular grooves are formed in the opposing end faces of the flange pipe ends;

FIG. 2 shows mainly the same as FIG. 1, but illustrates a different embodiment, where the disc packer itself exhibits said annular grooves, one such groove being formed in each of the opposite side faces of the disc packer, relatively large face portions of said side faces constituting sealing faces for said opposing end faces of adjacent flange pipe ends, another variation from the embodiment of FIG. 1 consisting in a state indicator disposed on the outer end of a channel through one flange pipe end, the inner end of the channel opening out into one annular groove of the flat disc-shaped packer;

Figure 1:
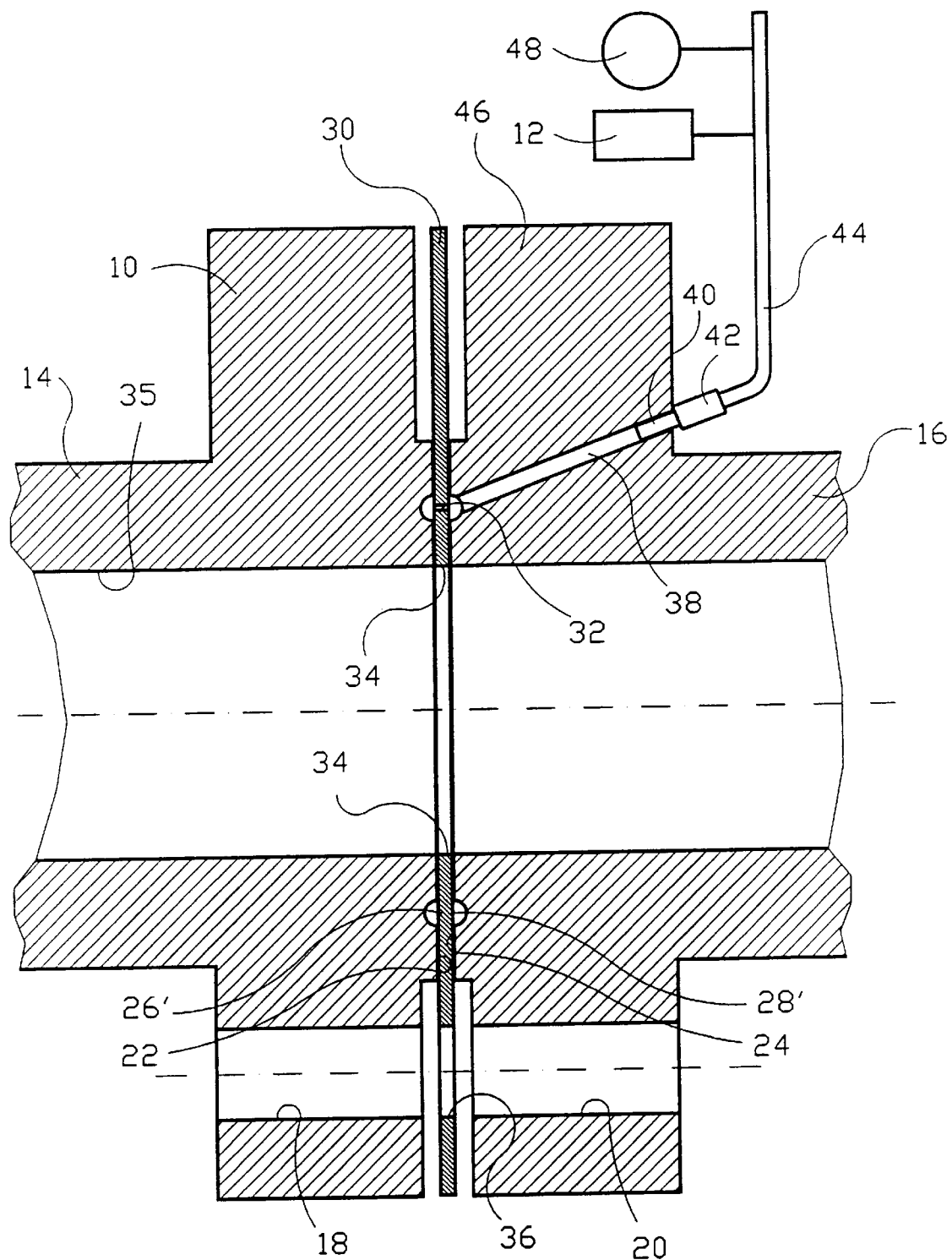

Reference is first made to FIG. 1, showing an embodiment of the invention which exhibits some features common with features of the previously described known device according to No. patent specification No. 175 832.

In the various figures, equal parts and components are denoted by the same reference numerals.

Figure 2:
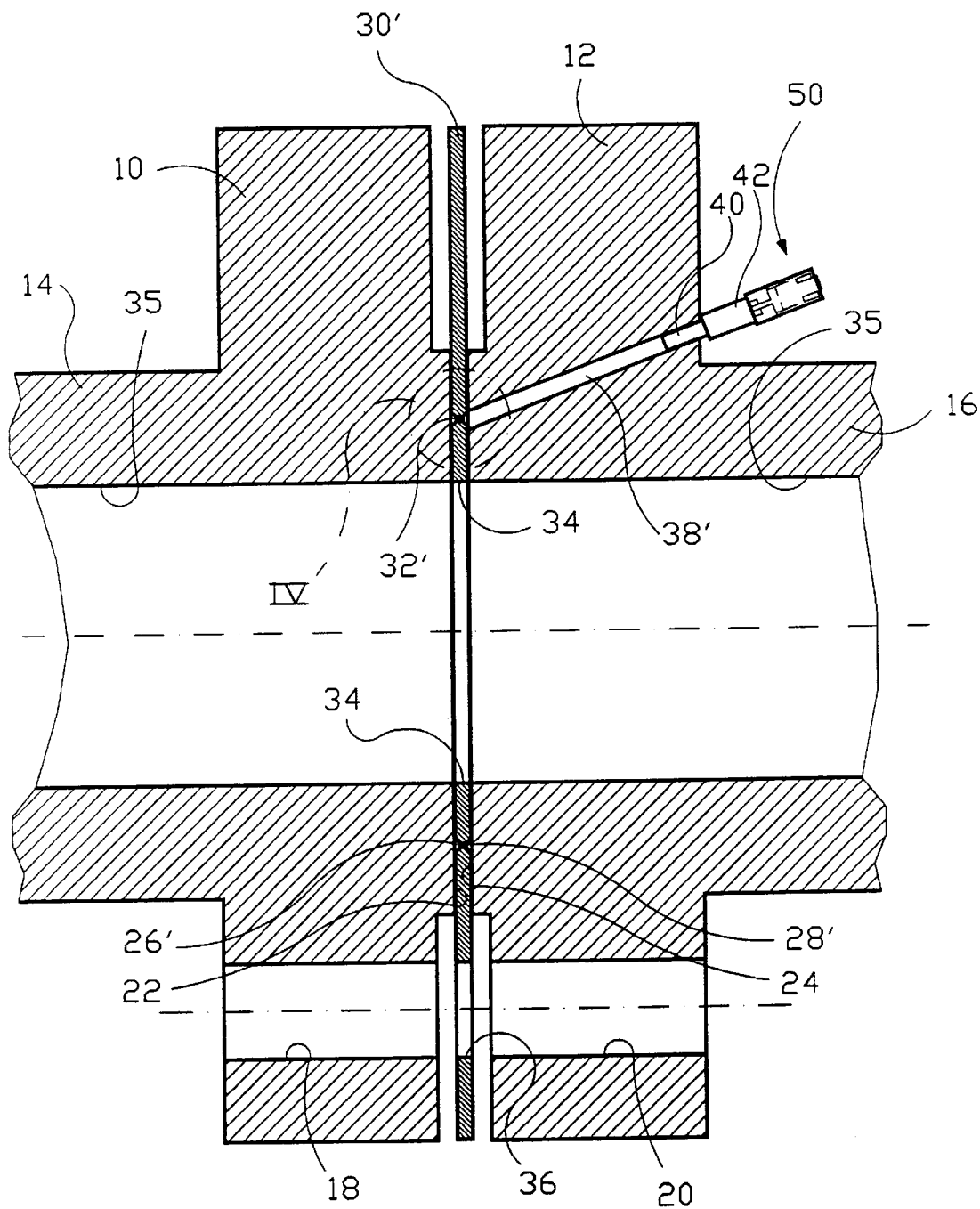
Figure 3:
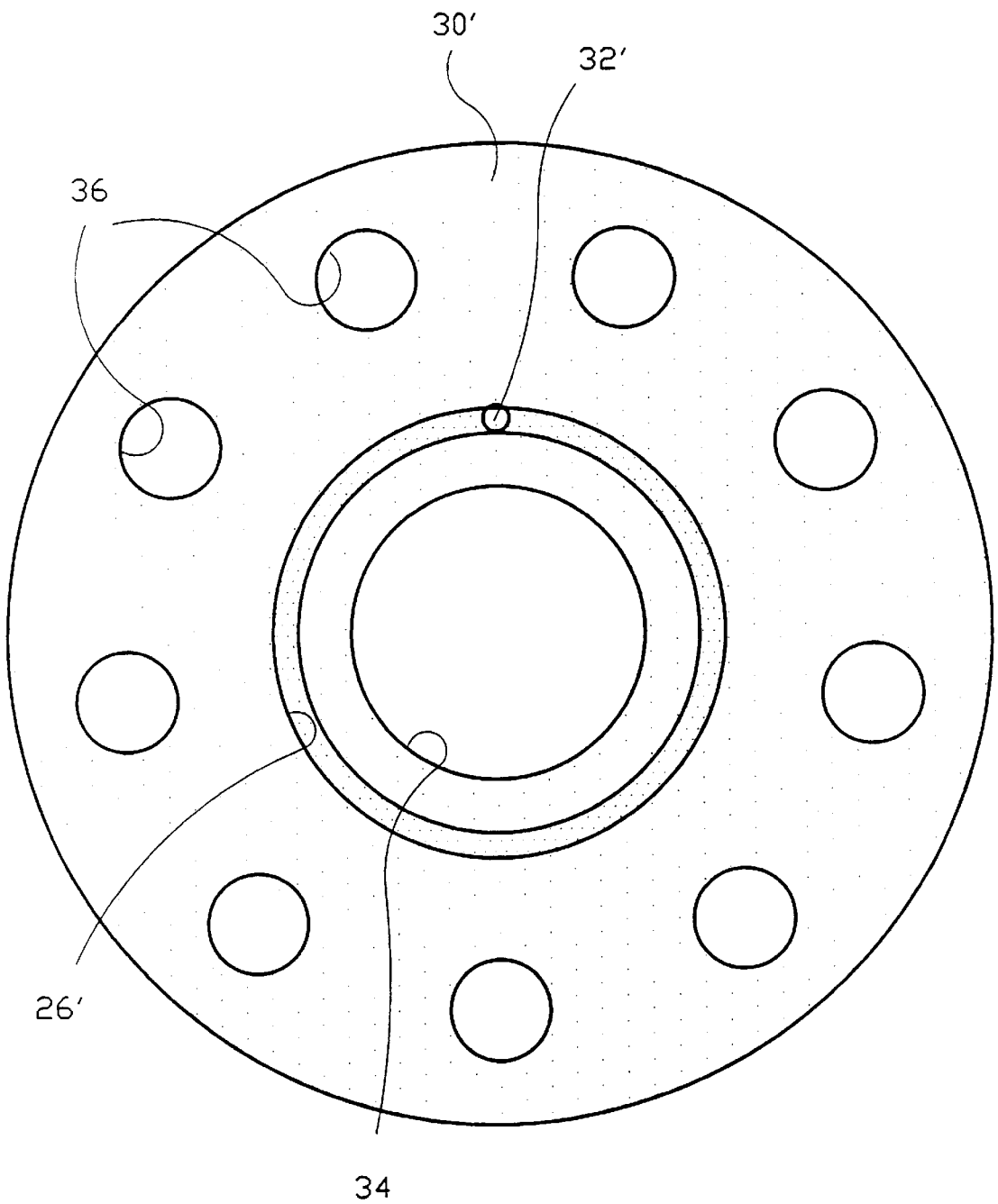
FIG. 3 shows the flat disc-shaped packer, as seen separately from one side thereof.
Figure 4:
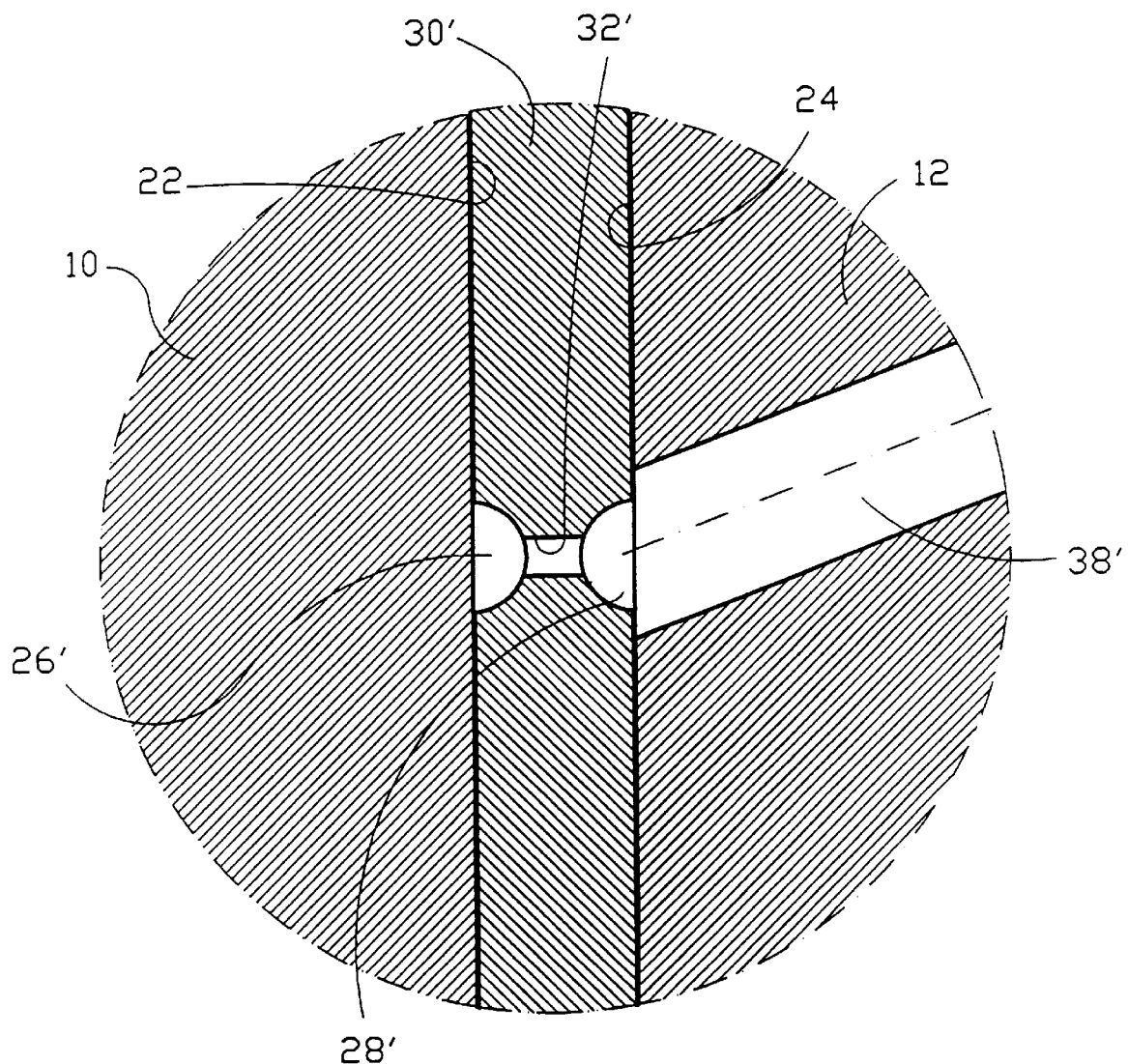
FIG. 4 shows, on a larger scale, an encircled portion IV in FIG. 2, from where appears the cross-sectional shape of the oppositely directed, annular grooves in the flat disc-shaped packer, simultaneously as the figure shows the through-going hole and a portion of the channel through the pipe flange portion.

In FIGS. 1, 2 and 4, reference numerals 10 and 12 denote two adjacent joint flanges each positioned at the end of an individual pipe 14 and 16, respectively. Said pipes are considered to be included in a pipe installation.

The joint flanges 10 and 12 are ring flanges each having a circular circumference and, along the circumference, the flanges 10, 12 are formed with a plurality of equidistantly distributed, aligned bores 18 and 20, respectively, for the accommodation of bolts (not shown).

Each of the opposing end faces 22 and 24 of neighbouring flange pipe ends is formed with an annular groove 26 and 28, respectively, which, contrary to the known trapezoidal cross-sectional shape, may have a circle arc-shaped cross-section or, in any case, a simple rounded cross-sectional shape representing a simplified manufacturing as compared with known annular grooves exhibiting a trapezoidal cross-section, said prior art grooves partially engaging around a sealing ring having an octagonal cross-section, the sealing ring comprising four distinct sealing faces, while the groove-defining face portions form two seat faces at each groove.

Said opposing end faces 22 and 24 are intended to accommodate therebetween a flat, disc-shaped packer 30 shaped and designed in accordance with the present invention. The opposing end faces 22 and 24 of adjacent flange pipe ends bear against plane sealing face portions of the packer 30 and constitute plane seat surfaces therefore. Sealing surfaces and seat surfaces, respectively, bearing against each other, exhibit a very substantial surface area, several times as large as the area exhibited by the sealing ring according to said No. patent specification No. 175 832. Moreover, the flat, disc-shaped packer's 30 opposite sealing faces close the grooves 26, 28, so that these, thereafter, constitute outwardly closed annular cavities. The packer 30 is, as known per se, equipped with a through-going hole 32, establishing a fluid communication between said annular cavities 26, 28.

In the shown examplary embodiments, the flat, disc-shaped packer 30 is centrally provided with a through-going hole 34 having pipeline bore dimension and which is brought to register with the pipeline bore 35. Moreover, the packer 30 has holes such as 36 close to the circumference. These holes 36 are equally spaced and has each the same diameter as the bores 18 and 20, respectively, of the pipe flanges 10 and 12, respectively, as well as they are brought to correspond thereto when the bolt connections have to be established.

According to FIG. 1, a channel 38 passes through one pipe flange and, with one end thereof, opens out into the right hand annular cavity 28. Through the through-going hole 32 in the packer 30, the channel 38 also has fluid communication with the left hand annular cavity 26. In principle, nothing should prevent the cavity 26 from being assigned its own channel corresponding to the channel 38, the through-going hole 32 of the packer 30 then being superfluous.

If the flange joint place shown in FIG. 1 is tight, fluid from the bore of the pipeline will not land in the annular cavities 26, 28, because the considerable sealing face areas of the packer bearing against corresponding seat faces on the end faces of the flange pipe ends prevent fluid passage in the lateral direction of the pipeline. If, on the contrary, a leakage exists at a flange joint place, fluid from the bore 35 of the pipeline 14,16 will, due to pressure within the latter, be forced into one or the other cavity and may, therefrom, be forced further to the outside of the pipeline, provided that packer face portions resting against seat face portions of the end faces 22, 24 radially outside the cavities 26, 28, exhibit leakages. This subject will be resumed in connection with the embodiment of FIGS. 2–5.

According to FIG. 1, the channel 38 is, at the outer end thereof, provided with an internally threaded collar 40, into which it normally can be screwed a plug, not shown, but which, upon leakage testing, is interconnected to an externally threaded, socket-shaped connector 42 carrying a tube 44, assigned partially a pressure source 46—e.g. a pressure bottle containing nitrogen—partially a pressure gauge 48. The device 38,40,42,44,46,48 is known from No patent specification No. 175 832. Therefore, just a brief explanation suffices. Testing of the flange joint 10,12 involves that test medium from the pressure source 46 is admitted into the annular cavities 26, 28 through the pipe 44, the channel 38 and the through-going hole 32 in the flat, disc-shaped packer 30, thereby pressurizing the cavities 26, 28 until test pressure can be read on the pressure gauge 48. Thereafter, possible leakage in the flange joint 10,12 finds its immediate expression in a pressure drop readable on the pressure gauge 48. If the test pressure indicated by the pressure gauge 48 maintains constant, the flange joint is tight.

Reference is made to FIGS. 2–5, where a flat, disc-shaped packer 30' has the same shape as in FIG. 1, except from the fact that the disc packer in FIG. 2 is formed with annular grooves 26', 28' in opposite side faces, the grooves 26', 28' of the packer 30' replacing the annular grooves 26, 28 which, according to FIG. 1, are formed in opposing end faces 22, 24 of adjacent flange pipe ends.

The forming of the grooves 26', 28' which, when the packer side faces come to rest against said end faces 14, 16, are closed by the latter, forming annular cavities in fluid communication with each other through the through-going hole 32' of the packer 30', involves the advantage that it becomes unnecessary to turn grooves in the seat faces 22, 24 of the flanges 10, 12.

In the embodiment shown in FIGS. 2–5, the annular grooves 26', 28' are shaped with a circle arc-shaped cross-sectional form or another simple cross-sectional shape easy to manufacture.

The outer end of the channel 38' may carry equipment 44,46, 48 as shown in FIG. 1.

Figure 5:
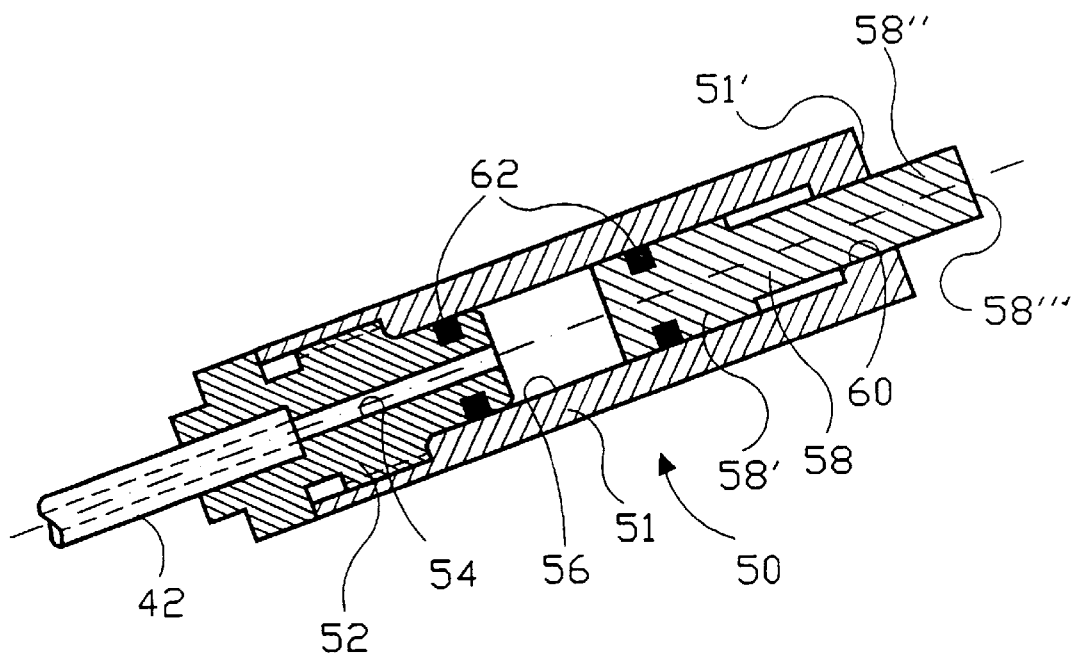
FIG. 5 shows an axial section through a state indicator.

However, FIGS. 2 and 5 show another possibility: On the outer end of the channel 38', situated outside the pipeline 14,16, is mounted a socalled state indicator generally denoted at reference numeral 50.

This state indicator 50 is shown more in details in FIG. 5, showing an axial section through the same. Thus, it shows the connection of the state indicator 50 to the outer end portion of the channel 38' through the socket 40 and the connector 42. The connector 42 is screwed into another connector 52 having an axial bore 54 opening out into a chamber 56, which is defined by the internal mantle face of the cylinder 51. A piston end portion 58' having a larger diameter than an axial bore 60 in the cylinder 51, acts as a stop means for the piston 58. The outwardly projecting end portion 58" of the piston 58 has an axial length somewhat smaller than the axial extent of the chamber 56. In the starting position, the outer end face 58''' of the piston 58 is approximately aligned with the end wall 51' of the cylinder 51. Upon a leakage at the flange joint place in question, fluid from the bore 35 of the pipeline 14,16 penetrates into one of the annular cavities 26', 28' and, from there, up through the channel 38', simultaneously as fluid is transferred to the other cavity through the through-going hole 32' of the flat, disc-shaped packer 30'. From the channel 38', said leakage-fluid enters into the chamber 56, wherein a pressure built up takes place, displacing the piston 58 such that it, finally, takes the position shown in FIG. 5, with a visually well recognizable end portion projecting out from the end 51' of the state indicator. An outwardly projecting piston portion will be easy to observe visually in connection with the ordinary attention, operation and inspection of the pipe installation. 62 denote small packers.

I claim:

1. A device for enabling detection of leakage in flange joints disposed on ends of pipelines included in process plants, comprised of:

a plurality of flange joints (10,12) having end faces (22,24), said plurality of flange joints (10,12) being formed with circumferentially distributed, equally spaced, mutually aligned bolt holes (18,20) for bolt connections;

an annular packer (30) disposed between adjacent said end faces (22,24) of said flange joints (10,12);

a central hole (34) in said annular packer (30) and in alignment with central bores (35) of adjacent said pipelines (14,16);

at least one through hole (32);

two annular cavities (26,28) communicating through said through hole (32) and each positioned at one of two opposing said end faces (22,24) of said flange joints (10,12);

a channel (38) being formed between one annular cavity (28) and outside of said pipelines in the area of said flange joint (12) and through pipe wall material, said channel (38) lined with a piece of pipe (40) having internal threads for screwing thereon a connector to be coupled to a state indicator (50) adapted to detect leakage, said annular packer (30) being a flat ring disc having opposite side faces and being formed with annular grooves (26',28') for forming said cavities (26,28) communicating through said at least one through hole (32) and through said packer (30);

said annular packer (30), both radially outside and radially inside said cavities (26,28), has plane sealing faces with large areas for sealing contact against said opposing sealing face portions of end faces (22,24) of said flange portions (10,12);

said annular packer (30) radially outside sealing faces thereof, in addition to said central hole (34), is formed with circumferentially distributed, equally spaced holes (36) having the same individual size and spacing of said bolt holes (18,20) and adapted to register with said mutually aligned bolt holes (18,20) in adjacent said flange joints (10, 12), in order to guide and position one of said annular cavities (26,28) in relation to an inner aperture of said channel (38), so that fluid communication is established therebetween.

2. A device as set forth in claim 1, wherein:
   said annular grooves (26, 28; 26', 28') each has a rounded, semicircular or arc, cross-sectional form.

3. A device as set forth in claim 1, wherein:
   said state indicator (50) having a displaceable piston (58) with an end portion (58') which, through internal pressure within a cylinder (51) of said state indicator (50), becomes pushed out from said cylinder (51) indicating a leakage in said flange joints (10,12).

4. A device as set forth in claim 2, wherein:
   said state indicator (50) which, through internal pressure within a cylinder (51) of said state indicator (50), becomes pushed out from said cylinder (51) indicating a leakage.

5. A device as set forth in claim 3, wherein:
   said state indicator (50) has an end connector (52) for connecting said state indicator (50) to said channel (38), said connector (52) having an axial bore (54) opening out into a closed and sealed chamber (56) defined by the inner end face (58') of the piston (58), said piston inner end face (58') of said piston (58) having a larger diameter than said piston's (58) end portion (58"), which is extendable outside the free end of said state indicator (50), a cylinder end (51') of said state indicator (50) having a through-going, axial bore (60) having a diameter corresponding to the narrower, extendable end portion (58") of said piston (58).

* * * * *